United States Patent
Suzuki et al.

(10) Patent No.: US 6,179,402 B1
(45) Date of Patent: Jan. 30, 2001

(54) IMAGE RECORDING APPARATUS HAVING A VARIATION CORRECTION FUNCTION

(75) Inventors: Akio Suzuki; Hisashi Fukushima, both of Yokohama; Yoshihiro Takada, Kawasaki, all of (JP)

(73) Assignee: Canon Kabushiki Kaisha, Tokyo (JP)

(*) Notice: Under 35 U.S.C. 154(b), the term of this patent shall be extended for 0 days.

(21) Appl. No.: 09/457,081

(22) Filed: Dec. 7, 1999

Related U.S. Application Data (62) Division of application No. 08/878,584, filed on Jun. 19, 1997, now Pat. No. 6,045,210.

(30) Foreign Application Priority Data

Apr. 28, 1989 (JP) .................................................. 10-107744

(51) Int. Cl.[7] ...................................................... B41J 2/05
(52) U.S. Cl. ............................................................. 347/19
(58) Field of Search .............................. 347/19, 191, 188; 358/296, 406, 298

(56) References Cited

U.S. PATENT DOCUMENTS

| | | | |
|---|---|---|---|
| 3,657,707 | 4/1972 | McFarland et al. | 365/127 |
| 4,449,052 | 5/1984 | Krieg | 250/568 |
| 4,463,359 | 7/1984 | Ayata et al. | 347/56 |
| 4,574,293 | 3/1986 | Inui et al. | 347/196 |
| 4,630,075 | 12/1986 | Hori | 347/91 |
| 4,739,415 | 4/1988 | Toyono et al. | 358/296 |
| 4,751,377 | 6/1988 | Ishizaka et al. | 250/205 |
| 4,827,279 | 5/1989 | Lobinsky et al. | 347/188 |
| 4,829,323 | 5/1989 | Suzuki et al. | 347/15 |
| 4,853,768 | 8/1989 | Suzuki et al. | 358/80 |
| 4,855,766 | 8/1989 | Suzuki | 346/160 |
| 4,864,419 | 9/1989 | Saito et al. | 358/300 |
| 4,872,024 | 10/1989 | Nagai et al. | 347/4 |
| 4,882,621 | 11/1989 | Suzuki et al. | 358/80 |
| 4,897,672 | 1/1990 | Horiuchi et al. | 347/236 |
| 4,967,204 | 10/1990 | Terasawa et al. | 347/23 |
| 5,038,208 | 8/1991 | Ichikawa | 358/502 |

FOREIGN PATENT DOCUMENTS 0032068  2/1987  (JP) .

OTHER PUBLICATIONS

McAdams, W.H., "Heat Transmission", pp. 368–371 (McGraw–Hill, 1954).
Herbert, Alan J., "Large Area Imaging", Journal of Imaging Technology, vol. 10, No. 5, Oct. 1984, pp. 201–206.

Primary Examiner—N. Le
Assistant Examiner—Anh T. N. Vo
(74) Attorney, Agent, or Firm—Fitzpatrick, Cella, Harper & Scinto (57) ABSTRACT

An image recording apparatus for recording an image in accordance with input image data supplied thereto using a recording head having a plurality of recording elements arranged thereon. The apparatus includes a sensor for detecting and determining non-uniformity of the densities of the records provided by the respective recording elements, at predetermined timing in image recording operations, and adjusting means for adjusting driving signals applied to the respective recording heads in response to an output of sensor.

12 Claims, 7 Drawing Sheets

IMAGE RECORDING APPARATUS HAVING A VARIATION CORRECTION FUNCTION

This application is a Division of application Ser. No. 08/878,584, filed Jun. 19, 1997, now U.S. Pat. No. 6,045,210.

FIELD OF THE INVENTION AND RELATED ART

The present invention relates to an image recording apparatus, and more particularly to an image recording apparatus with a multi-recording-element head.

With the wider use of a computers and communication machines, digital image forming machines using a recording head of an ink jet type or a thermal transfer type are increasingly used.

In an image recording apparatus using a recording head, a multi-element (image recording element) head is used for the recording head in order to increase the recording speed. In the case of the ink jet recording head, a multi-nozzle head having plural number of ink ejection nozzles is widely used, and in the case of the thermal transfer type head, plural heaters are provided.

It is difficult to produce multi-element heads wherein all of the elements in each head perform identically, and therefore, it is substantially unavoidable that the properties of the different image recording elements will vary. In the case of the ink jet multi-element head, for example, the dimensions and/or configurations of the several nozzles in one recording head may be different, and in the case of the multi-element head of the thermal transfer type, the configuration and/or the resistance of the heaters can vary. The variation of the properties of the image recording elements results in the variations in the sizes and densities of the dots provided by the image recording elements, and therefore, results in image density non-uniformity in the recorded image.

Some proposals of solutions to this problem have been made by adjusting the signals supplied to the image recording elements.

Figure 2:
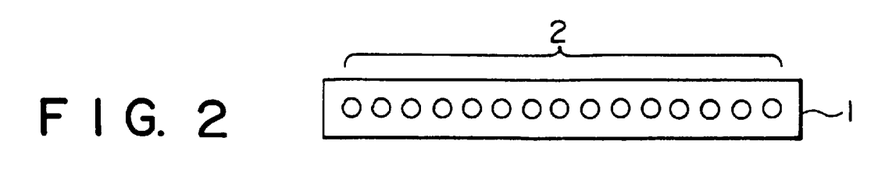
FIGS. 2–6 illustrates correction of density non-uniformity.
Figure 3:
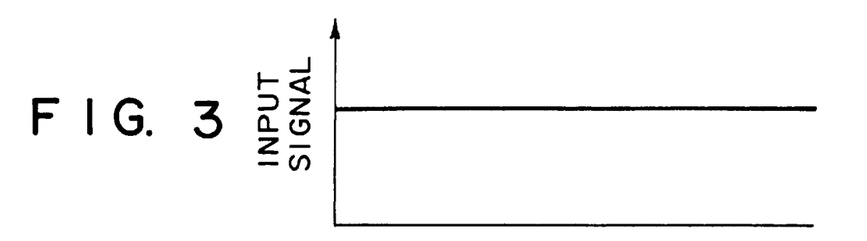
Figure 4:
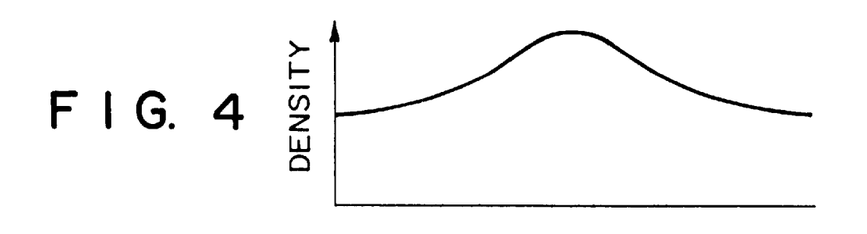
Figure 5:
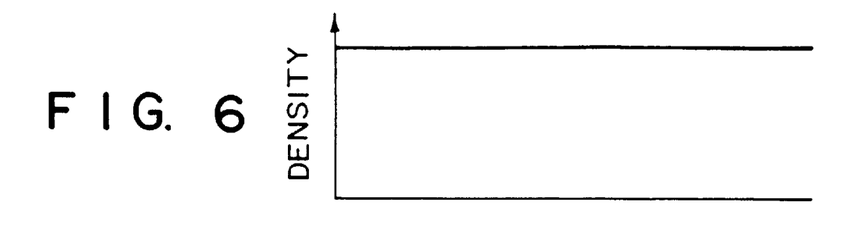
Figure 6:
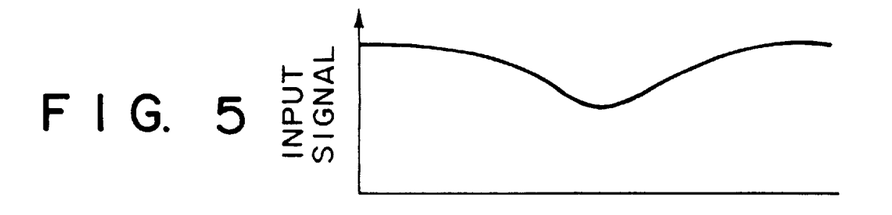
Figure 7:
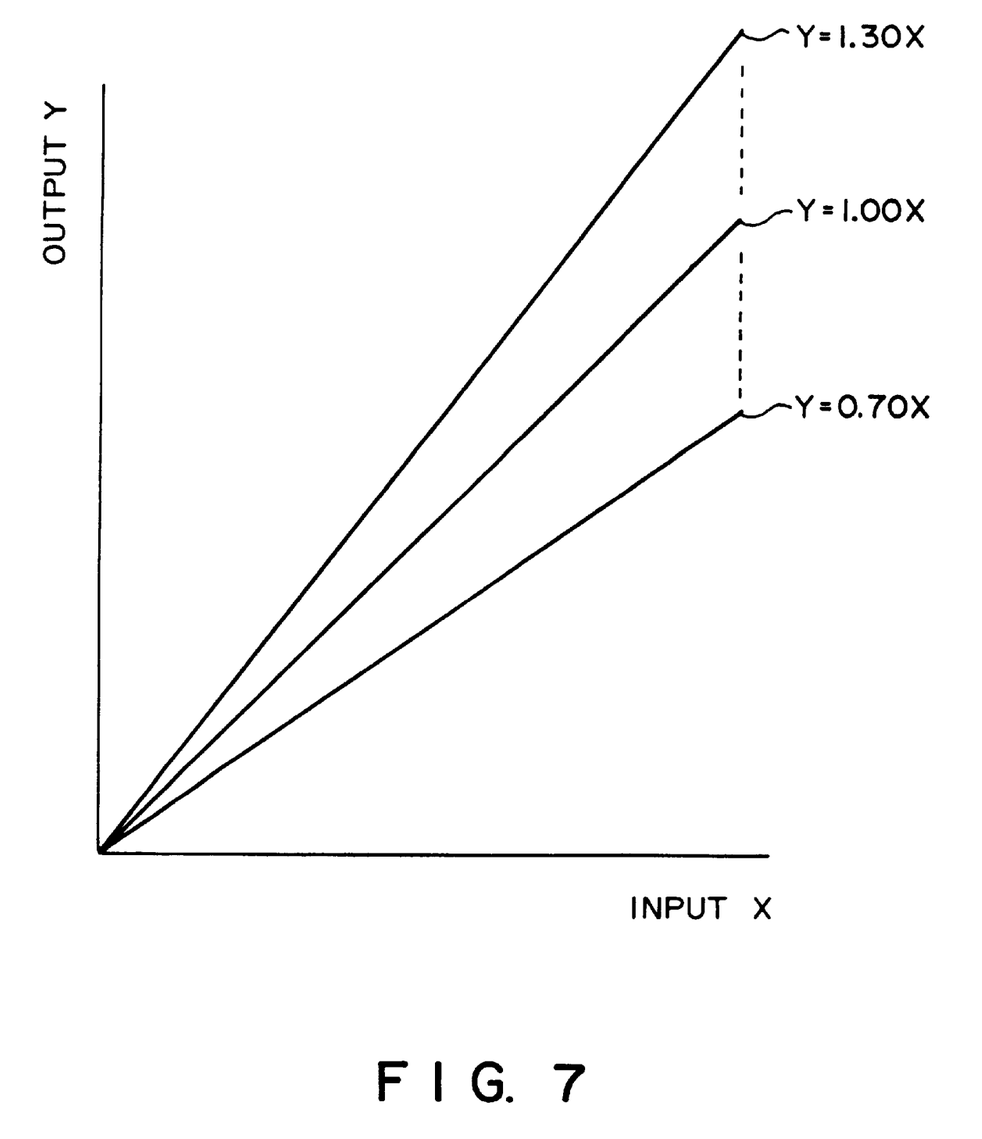
FIG. 7 shows a conversion characteristics of a density variation correcting table in this embodiment.

Referring first to FIG. 2, there is shown an example of a multi-element head 1 provided with a plurality of recording elements 2. It is assumed that when the uniform electric signals are supplied to the image recording elements, as shown in FIG. 3, the resultant image density is non-uniform as shown by FIG. 4. To avoid the non-uniformity, the supplied signals are adjusted as shown by FIG. 5, by which a large input is supplied to the image recording element providing the low density, and a small input is supplied to the image recording element providing the high density. By doing so, the resultant recording is as shown by FIG. 6.

In the case of the recording system in which the size or the dot density is adjustable, the dot sizes are changed in accordance with the inputs. In the case of the ink jet recording system using piezoelectric elements, the driving voltage or the width of the driving voltage pulse applied to each of the piezoelectric element is changed in accordance with the input signal. In the case of the thermal transfer system, the driving voltage or the pulse width applied to the heater is changed in accordance with the input signal. By doing so, the dot sizes and dot densities by the recording elements are made uniform, as shown in FIG. 6.

There is also the case wherein the dot size or the image density of the dots are not changed, or it is difficult to change the number of dots in accordance with the input. Here, a large number of dots are formed by an image recording element providing the low density image, and a smaller number of dots is presented by an image recording element providing a high density image. By doing so, the density distribution is made uniform as shown in FIG. 6.

It is possible to correct the image density variations. However, there arises a problem.

That is, although the density variation can be corrected once, the density variations may still change thereafter, and so the adjustment of the input signal is no longer proper. For example, in the case of the ink jet recording head, the density distribution may change due to deposition of ink pigment adjacent the ink outlet nozzle and/or be due to foreign matter deposited externally. In the case of the thermal transfer type, the image density distribution may change due to deterioration of or change in the heater elements. The initial input adjustment is not effective to correct the changing density non-uniformity. In some cases, the initial adjustment makes the situation worse.

U.S. Ser. No. 480,041 filed on Feb. 14, 1990 and assigned to the assignee of the present application proposes one way to reduce the image variation. However, there still remain the problems to be solved.

SUMMARY OF THE INVENTION

Accordingly, it is a principal object of the present invention to provide an image recording apparatus wherein the variation in recorded dot's variations over time and/or with use can be minimized.

It is another object of the present invention to provide an image recording apparatus wherein variations the individual recording elements can be corrected.

According to an embodiment of the present invention, there is provided a recording apparatus, comprising a recording head having plural recording elements for recording an image in accordance with input image data, detecting means for detecting density variation of the recording elements at predetermined timing and adjusting means for adjusting driving signals applied to the recording head on the basis of a result of detection by detecting means.

According to this embodiment, the adverse effects due to changes with use or time in the respective recording elements can be minimized.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Referring to the accompanying drawings, the preferred embodiments of the present invention will be described.

Figure 1:
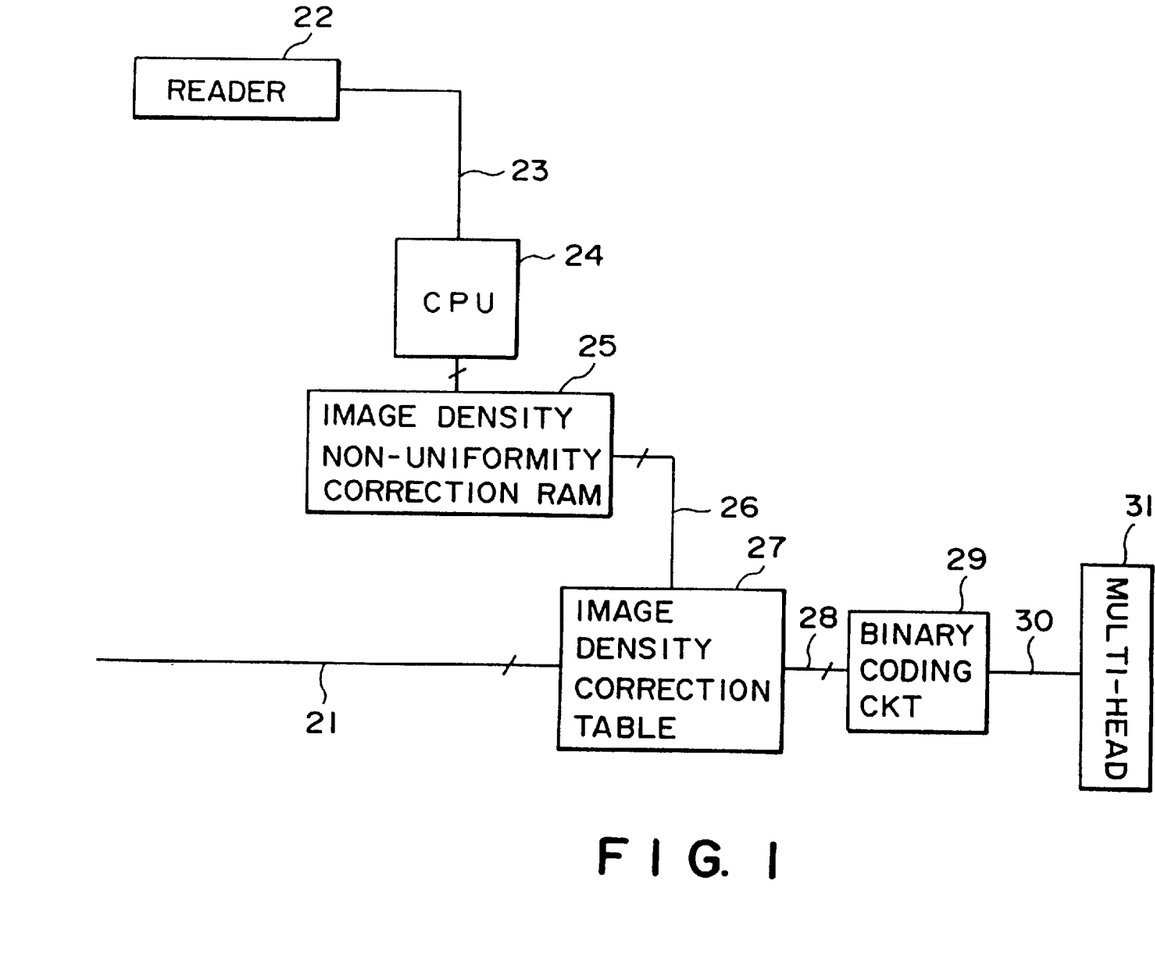
FIG. 1 is a block diagram illustrating a major part of an image recording apparatus according to a first embodiment of the present invention.

FIG. 1 is a block diagram illustrating a major portion of an image recording apparatus according to an embodiment of the present invention. Reference numeral 21 designates a given image signal. The apparatus comprises a reader 22 for reading a variation in the density of the record, which reader comprises CCD elements or photodiode elements, for example, and a driving circuit for the CCD or the photodiode to produce an output 23. The apparatus further comprises a CPU 24 for controlling the entire apparatus, a RAM 25 for the density variation correction for producing a correction signal 26 and a correction table 27 for producing a corrected image signal 28, a binary coding circuit 29 for producing a binary coded signal 30 and an ink jet, for example, head 31 having 256 nozzles as the recording elements.

The input signal 21 is converted by the density variation correction table 23 so as to correct the image variation of the multi-element head 31. The correction table 27, as shown in FIG. 3, for example, contains 61 correcting lines from a line representing $Y=0.70$ X to $Y=1.30$ X (X is an input image density, and Y is a corrected image density) with the increment of slope of 0.01. In response to the correction selecting signal 26 (6 bits are enough) produced by the density correcting RAM 25, a proper one of the correcting lines is selected.

More particularly, the input signal correction operation is as follows. When a picture element signal is applied to a nozzle having a property of providing a relatively large dot size, a correcting line having a small slope is selected, whereas when the picture element signal is supplied to a nozzle having a property of providing a relatively small dot size, a correcting line having a large slope is selected. The size of the dot, that is, the printed image density is detected on the basis of detection of the density for each of the nozzles by the reader 22.

The data for the correcting RAM 25 are produced in accordance with the property of the variation of the head, and the determination is made as to which correcting line is to be selected from the 61 lines. Thus, the correcting line for each of the nozzles, that is, the level of the correcting signal 26 for each of the nozzles is stored.

The corrected signal 28 corrected by the correcting RAM 25 and the correcting table 27 is binary-coded by the binary coding circuit 29 of a dither process type or error dilution process type, and is supplied to the multi-element head 31, and then, the image forming operation is performed. As a result, the number of dots printed by the high density nozzle is small, whereas the number of dots by the low density nozzle is large, as a result of the correction. Thus, the density variation of the multi-element head is corrected.

In this embodiment, the data of the correcting RAM are not fixed. Rather, the reader 22 leads the density variation of the multi-element head actually used, and the RAM can be rewritten in accordance with an output of the reader 22.

The rewriting operation is as follows. First, the selection is made to the line having the slope of 1.0 in the correcting table, that is, the no correction state is established. Subsequently, the same input signals 21 are supplied to all the nozzles to actually print by the multi-element head 31.

Then, the print (sample print) is read by the reader 22 to detect the density non-uniformity of the multi-head 31.

Figure 8:
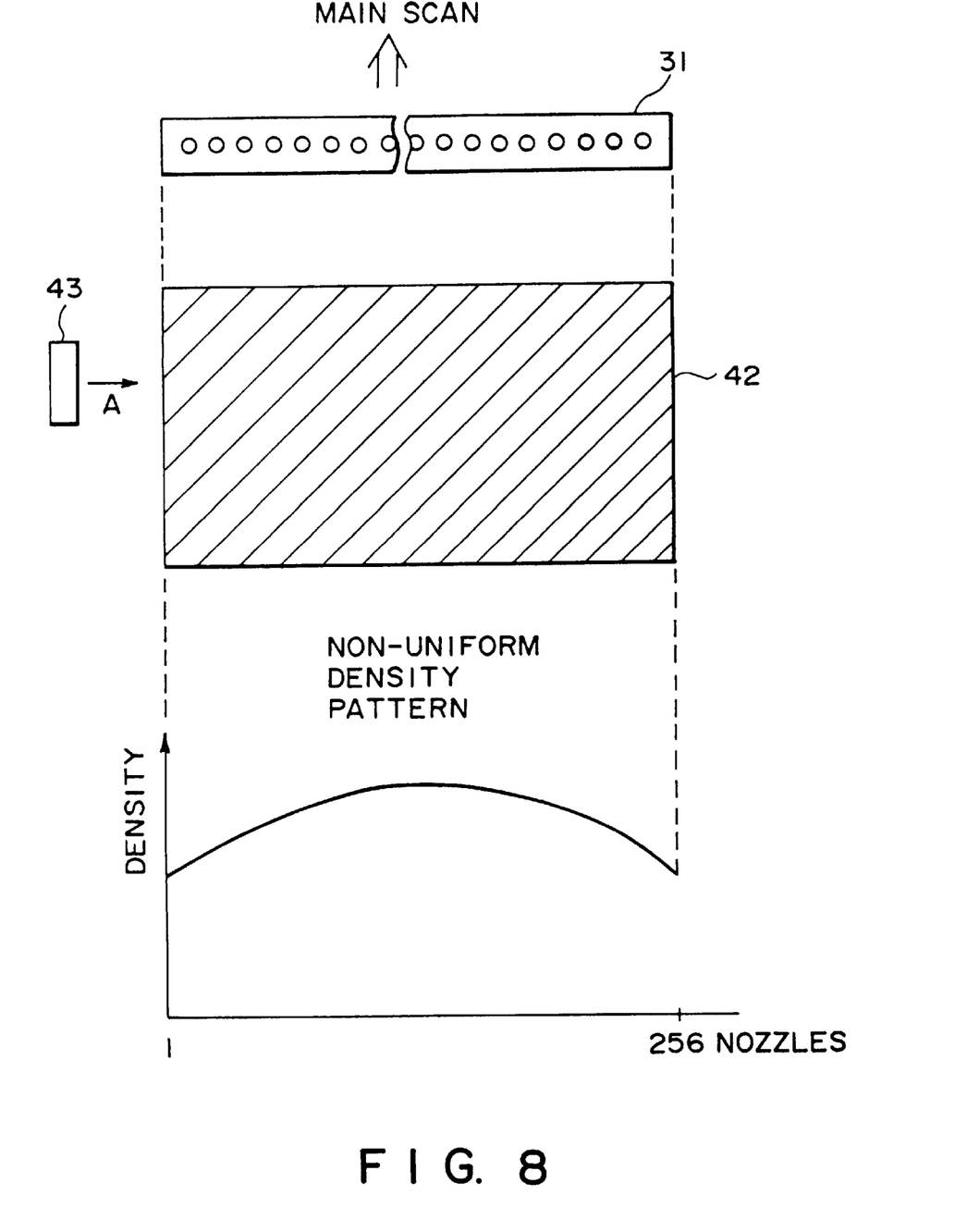
FIG. 8 illustrates the operational principle of the density variation detection in the first embodiment.

Referring to FIG. 8, the detecting principle will be described. By actuating all the nozzles of the multi-element 31, an output print 42 can be provided. The output image 42 is scanned by CCD elements 43 constituting the reader 22 while moving the CCD elements 43 in the direction A. The outputs of the CCD elements 43 are converted to digital image density signals by an density converter (not shown), by which the density variation pattern shown at the bottom of FIG. 8 is produced. The CPU 24 calculates the differences or ratios between the density by actually produced the nozzles using the variation pattern detected and a predetermined density level. On the basis of the calculation, a datum representing which correction table is to be selected for each of the nozzles is written in the correcting RAM 25. For example, if one of the nozzles is to be corrected by increasing by 20%, the line of slope $Y=1.20$ X is selected as the correcting line for the nozzle. If the density is not increased by 20% by the nozzle itself, the number of output dots by the nozzle is increased by 20% in the entire binary coded output image.

The correcting operation can be carried out after either a predetermined period of time or when a number of prints has been produced, for example. As a result, even if the density non-uniformity pattern changes, the correction can follow the change, and therefore, the output image is always good.

The correcting operation may be performed periodically by the user of the recording apparatus, or by a service man. A selector button for instructing the printing for the correction may be provided.

The reader 22 may be a reader for particularly determining the density variation as described in the foregoing. However, when the present invention is used for a digital copying machine, an original reader can be thereof can be used for this purpose.

According to this method, the structure becomes simple, and in addition, the reading non-uniformity of the original reader can be prevented.

Figure 9:
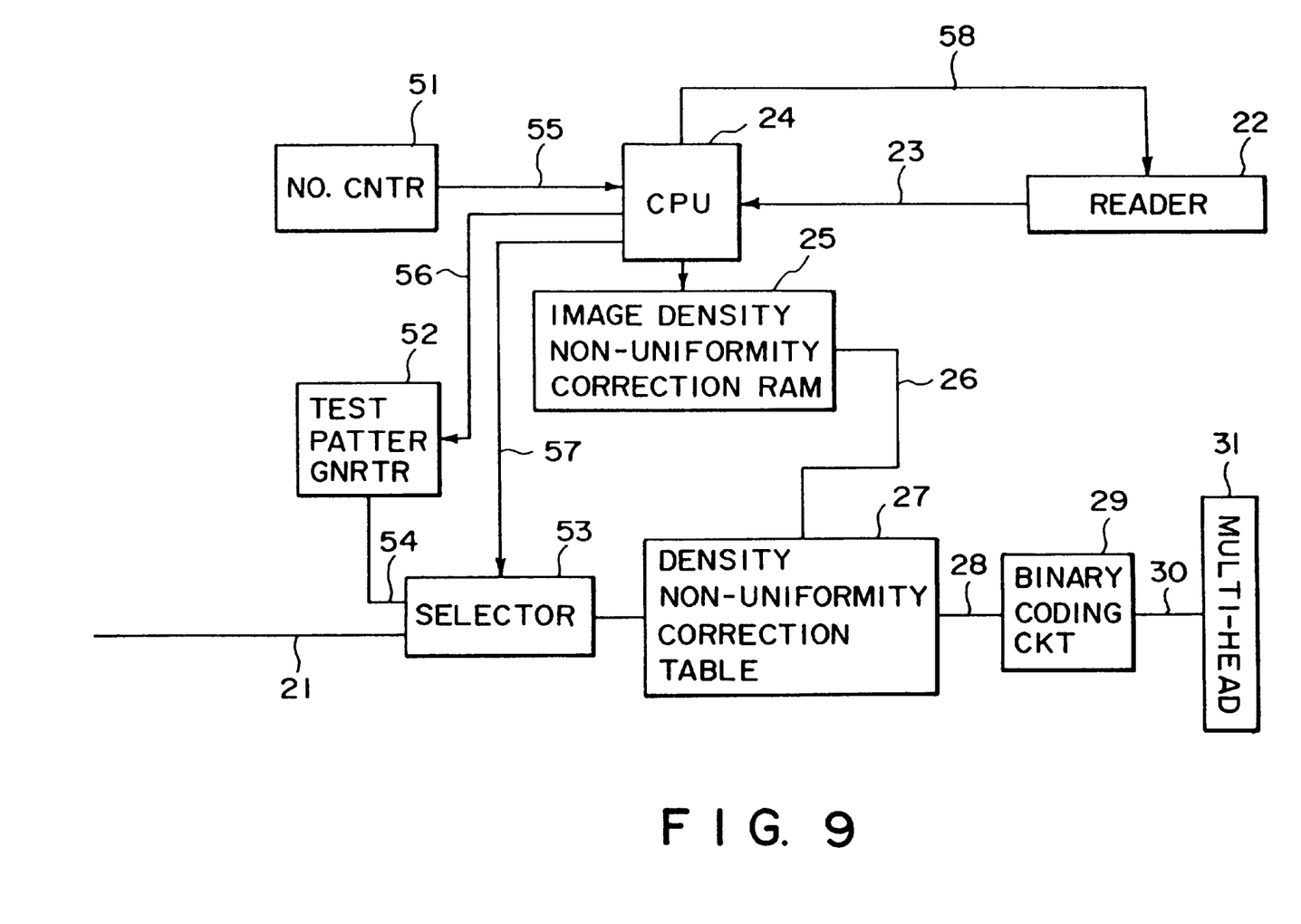
FIG. 9 is a block diagram illustrating a major portion of the apparatus according to a second embodiment of the present invention.
Figure 10:
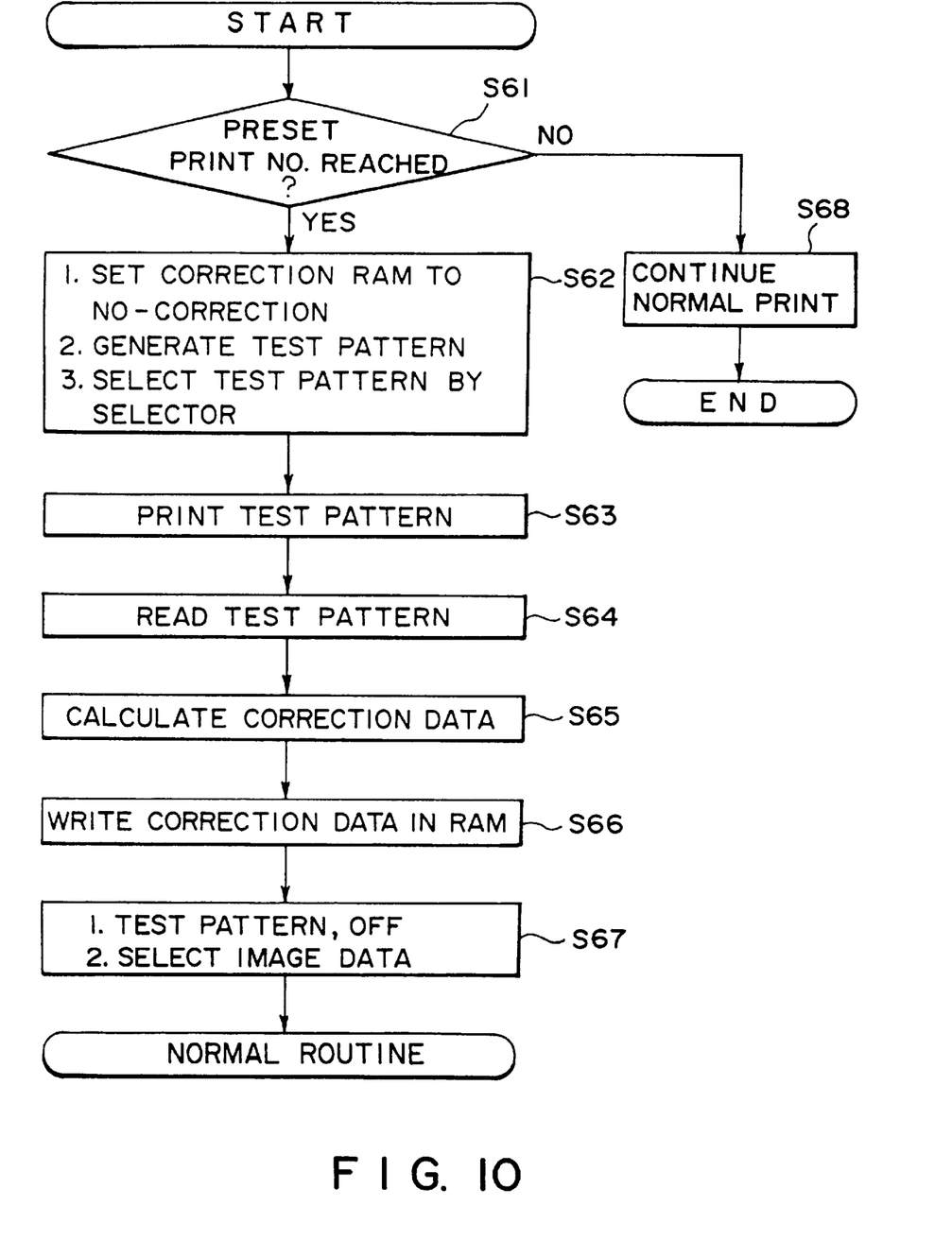
FIG. 10 is a flow chart illustrating the operation of a CPU (central processing unit) in the second embodiment.
Figure 11:
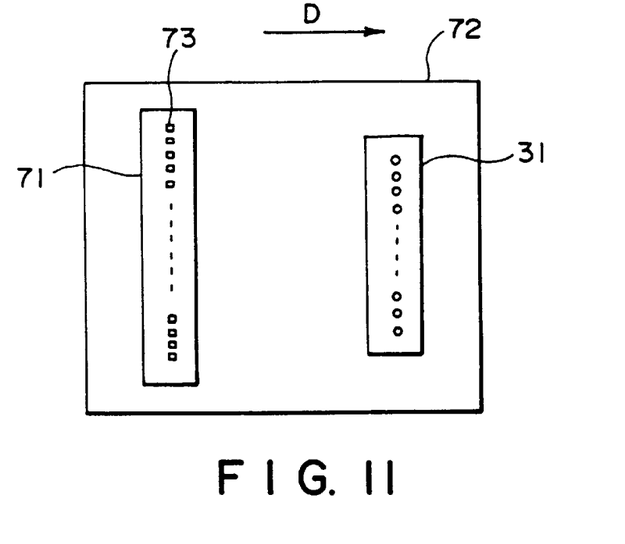
FIG. 11 shows a structure of a carriage in the apparatus of the second embodiment.

Second embodiment (FIGS. 9–11)

The second embodiment will be described. In the second embodiment, the density variation correcting RAM is automatically rewritten after a predetermined number of prints. FIG. 9 is a block diagram showing the control system. The same reference numerals as in FIG. 1 are assigned to the corresponding elements, and the detailed description thereof are omitted for simplicity.

FIG. 10 is a flow chart illustrating the data rewriting operation in this embodiment. The program for executing the operation shown in the flow chart is stored in a ROM (not shown) ROM in the CPU 24.

The number counter 51 counts the number of prints, and each time the number of prints reaches a predetermined number, it supplies to the CPU 24 a data rewriting signal 55. The CPU 24 discriminates whether the data rewrite starting signal 55 is received or not at step S61. If not, a step S68 is executed to perform the normal printing operation.

When the signal is received and detected, a step S62 is carried out to rewrite at first the current RAM 25 data in the data without correction. And then, a uniform test pattern signal having a proper duty level is produced, and when a selector 53 is operated, the test pattern signal 54 is selected as the input signal. In this state, the test pattern is printed by the multi-element head 31, at step S63. The printed pattern is read by the reader 22 at step S64 to detect the non-uniformity on the printed pattern. Subsequently, the density correction data is calculated using the pattern, at step S65. The calculated data are written in the correcting RAM 25 at step S66. Finally, the operation of the test pattern generator is stopped, and the selector 53 is operated to select the image signal 21. This is the end of the rewriting operation for the density variation (step S67).

As shown in FIG. 11, the multi-element head 31 and the reader 22 are integral, so that the printing of the test pattern and the reading thereof are carried out substantially simultaneously. In FIG. 11, reference numeral 31 designates a multi-element head; 71, a CCD element; 72, the carriage. The multi-element head and the CCD element are both mounted on the carriage 72, so that the CCD element scans the print in the direction D. The multi-element head 31 prints the test pattern, during which time the printed pattern by the multi-element head 31 is read by the CCD element 71. The CCD element 71 includes a number of reading element 73, so that the density non-uniformity pattern can be determined by one scan. In this embodiment, the series of operations are carried out automatically, and therefore, the user or the service man is not required to handle the apparatus to print the test pattern and read the printed pattern.

In the foregoing, the automatic correction is started on the basis of the number of prints produced, but is not so limited. For example, a timer may be employed in place of the number counter, and the non-uniformity detection and the rewriting of the correction data are carried out after the passage of a predetermined period of time. By doing so, it can be avoided that the density variation is changed because the apparatus is unused for a long period of time, although the number of prints is small.

In order to more correctly respond to the change in the density variation due to the long period of nonuse, a timer is employed to detect the rest period of the machine. The detection of the density variation and the rewriting of the correction data can be performed when the rest of the apparatus continues for a predetermined period of time, or they are carried out at the first recording operation after the rest period exceeding the predetermined period.

The correcting operation can be effected each time the main switches are actuated.

In any event, by performing the correcting operation automatically, the operator does not have to handle the apparatus to perform the correcting operation, so that the apparatus becomes more convenient.

Figure 12:
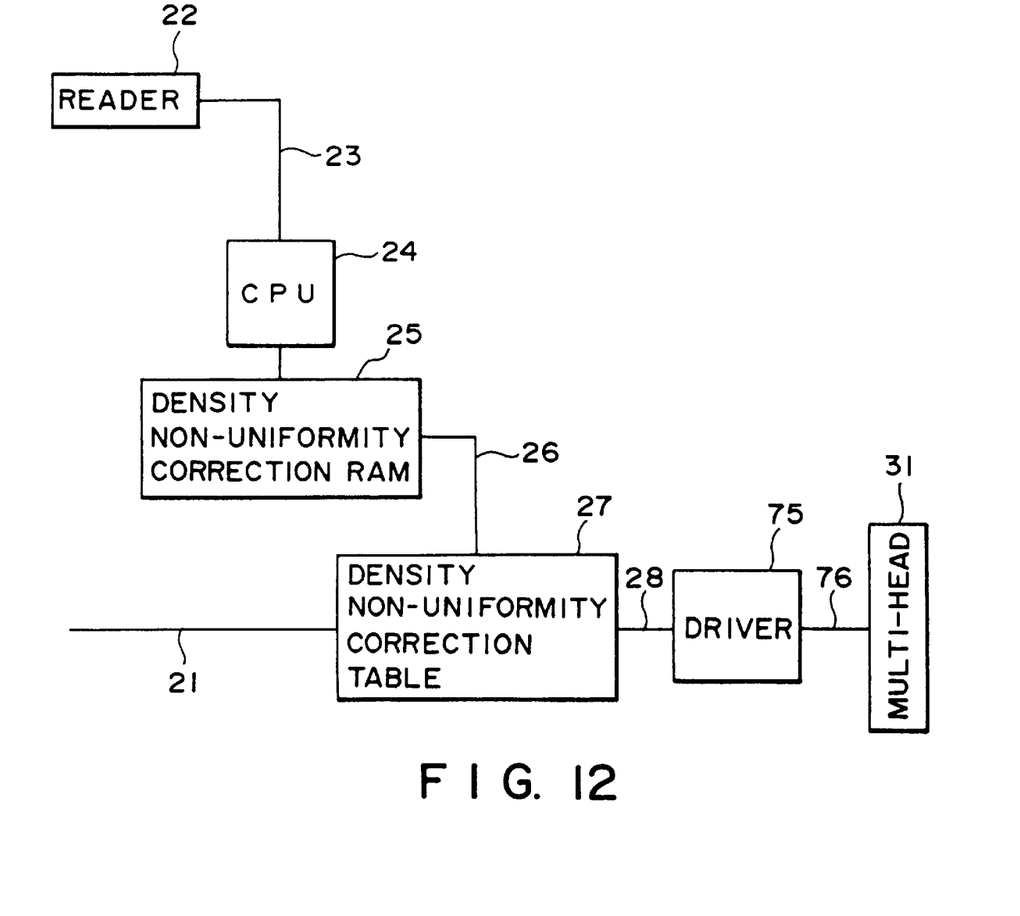
FIG. 12 is a block diagram illustrating an major portion of the apparatus according to a third embodiment of the present invention.

Third embodiment (FIG. 12)

The third embodiment is a modification of the first and second embodiments. In the first and second embodiments, the tone of the image is provided by binary coding process (dither process or an error diluting process) in other words, the number of output dots from each of the nozzle is changed when the entire image is seen.

In the third embodiment, the pulse width of the driving pulse applied to each of the nozzle is changed, by which the amount of ink ejected through the nozzle is corrected.

FIG. 12 is a block diagram for the correcting operation. The same reference numerals as in FIG. 1 are assigned to the elements having the corresponding functions, and the detailed description thereof is omitted for simplicity.

The image signal corrected by the density variation correcting table 27 is supplied to the driving circuit 75. The driving circuit 76 produces a driving pulse 6 having a pulse width corresponding to the corrected image signal 28, and drives the multi-nozzle head 31. The multi-nozzle head 31 is of a piezoelectric element type, for example, so that the amount of ink ejected can be changed in accordance with the driving pulse width, so that the density variation can be corrected by changing the quantity of the ejected ink for each of the nozzles.

Also, the driving voltage can be changed. In this case, the function of the driving circuit 75 produces a driving pulse having a voltage level in accordance with the corrected signal 28.

As described, by controlling the quantity of the ink ejected through each of the nozzles, the present invention is applicable to a printer in which the input image is a binary coded image as in a wordprocessor, a personal computer or the like. In addition to the ink ejection using the piezoelectric element, the present invention is applicable to a so-called bubble jet printer in which a bubble is formed by a heater in the nozzle, and the ink is ejected by the pressure resulting from the formation of the bubble.

As described in the foregoing, according to this embodiment, even if the density variation of a printing head occurs with the passage of time, it can be readjusted easily, and therefore, good output images can be produced at all times.

In addition, the need for operators to adjust the device can be minimized by detecting the timing at which the correction is to be effected, and by automatically performing the density variation correction.

Furthermore, by correcting on the basis of the density of the actually printed dot provided by each of the images recording elements, very good output image can be provided, and the applicability is expanded.

In the present invention, the detecting means for detecting the density non-uniformity may effect its operation when the main switch of the printer is actuated, each time a predetermined number of prints are produced or each time a predetermined period of time passes. In other words, the present invention covers the case wherein the density non-uniformity is detected other than when the apparatus is shipped from a manufacturing plant.

In the foregoing, the description has been made as to the ink jet type printer, but the present invention is not limited to this device. The present invention is applicable to any apparatus wherein the recording operation is performed by scanningly moving a printing head having a plurality of image recording elements arranged. Therefore, the multi-element head may be a full-multi-element head having the length covering the image formation width or may be a semi-full-multi-element head of serious scan type.

The adjusting means for adjusting the driving signal applied to the recording head may adjust the image signal before the binary coding process as described hereinbefore or may adjust the signal after binary-coded.

According to this embodiment, the adjusting timing is detected, and the density variation can be automatically corrected, and therefore, the operator is not required to perform additional manipulation.

In an image recording apparatus for recording binary coded image signal, by directly adjusting the image density actually provided by each of the image recording elements, very good output images can be provided.

In the foregoing description, the recording apparatus of binary coded type printer has been taken, but the present invention is applicable to a multi-level coded printer, too.

As described in the foregoing, according to the present invention, good recording performance can be maintained even if density variation of the printing head occurs due to the passage of time.

By directly adjusting the density reproduced by the each of the recording elements, very good output images can be produced.

These and other objects, features and advantages of the present invention will become more apparent upon a consideration of the following description of the preferred embodiments of the present invention taken in conjunction with the accompanying drawings.

What is claimed is:

1. A control method for reducing non-uniformity of an image formed on a recording medium by a plurality of image forming elements, comprising the steps of:
    counting a number of inoperative periods of said plurality of image forming elements;
    causing said plurality of image forming elements to form an image on a recording medium in accordance with a count result of said counting step;
    checking non-uniformity of the image formed by said causing step substantially simultaneously with said causing step;
    generating data for correcting non-uniformity of said image in accordance with said checking step;
    storing the correction data for a subsequent image forming operation; and
    forming an image with said image forming elements on a recording medium based at least in part on the correction generated in said generating step.

2. A method according to claim 1, wherein said correcting step corrects the image formed by changing, on the basis of the data, a driving pulse supplied to each of said plurality of image forming elements.

3. A method according to claim 1, wherein said correcting step corrects the image formed by changing, on the basis of the data, an image signal corresponding to said plurality of image forming elements.

4. A control method for reducing non-uniformity of an image formed on a recording medium by a plurality of image forming elements, comprising the steps of:
    counting an elapse of time;
    causing said plurality of image forming elements to form an image on a recording medium in accordance with a count result of said counting step;
    checking non-uniformity of the image formed by said causing step substantially simultaneously with said causing step;
    generating data for correcting non-uniformity of said image in accordance with said checking step;
    storing the correction data for subsequent image forming operation; and
    forming an image by said image forming elements on a recording medium based at least in part on the correction data generated in said generating step.

5. A method according to claim 4, wherein said correcting step corrects the image formed by changing, on the basis of the data, a driving pulse supplied to each of said plurality of image forming elements.

6. A method according to claim 4, wherein said correcting step corrects the image formed by changing, on the basis of the data, an image signal corresponding to said plurality of image forming elements.

7. An apparatus for reducing non-uniformity of an image formed on a recording medium by a plurality of image forming elements, comprising:
    counting means for counting a number of inoperative periods of said plurality of image forming elements;
    causing means for causing said plurality of image forming elements to form an image on a recording medium in accordance with a count result produced by said counting means;
    checking means for checking non-uniformity of the image formed by said causing means substantially simultaneously with said causing means causing the plurality of image forming elements to form the image;
    generating means for generating data for correcting non-uniformity of said image in accordance with said checking means;
    storing means for storing the correction data for a subsequent image forming operation; and
    forming means for forming an image by said image forming elements on a recording medium based at least in part on the correction data generated by said generating means.

8. An apparatus according to claim 7, wherein said correcting step corrects the image formed by changing, on the basis of the data, a driving pulse supplied to each of said plurality of image forming elements.

9. An apparatus according to claim 7, wherein said correcting step corrects the image formed by changing, on the basis of the data, an image signal corresponding to said plurality of image forming elements.

10. An apparatus for reducing non-uniformity of an image formed on a recording medium by a plurality of image forming elements, comprising:
    counting means for counting an elapse of time;
    causing means for causing said plurality of image forming elements to form an image on a recording medium in accordance with a count result of said counting means;
    checking means for checking non-uniformity of the image formed by said causing means substantially simultaneously with said causing means causing the plurality of image forming elements to form the image;
    generating means for generating data for correcting non-uniformity of said image in accordance with said checking;
    storing means for storing the correction data for a subsequent image forming operation; and
    forming means for forming an image by said image forming elements on a recording medium based at least in part on the correction data generated by said generating means.

11. An apparatus according to claim 10, wherein said correcting step corrects the image formed by changing, on the basis of the data, a driving pulse supplied to each of said plurality of image forming elements.

12. An apparatus according to claim 10, wherein said correcting step corrects the image formed by changing, on the basis of the data, an image signal corresponding to said plurality of image forming elements.

* * * * *

UNITED STATES PATENT AND TRADEMARK OFFICE
CERTIFICATE OF CORRECTION

PATENT NO. : 6,179,402 B1
DATED : January 30, 2001
INVENTOR(S) : Akio Suzuki et al.

It is certified that error appears in the above-identified patent and that said Letters Patent is hereby corrected as shown below:

Title page,
Under Item [30], Foreign Application Data,
 "Apr. 28, 1989  (JP) ...........................10-107744" should read
-- Apr. 28, 1989  (JP) ...........................1-107744 --.

Column 1,
Line 13, "of a" should read -- of --;
Line 30, "configurations" should read -- configuration --;
Line 37, "non-uniformity" should read -- variation --.

Column 2,
Line 1, "are" should read -- is --;
Line 6, "variations" should read -- variation --;
Line 9, "variations" should read -- variation --;
Line 29, "recorded" should read -- the recorded --, "dot's" should read -- dots' -- and "variations" should read -- densities --;
Line 32, "variations" should read -- variations in --;
Line 56, "illustrates" should read -- illustrate --; and
Line 58, "a" should be deleted.

Column 3,
Line 3, "an" should read -- a --.

Column 4,
Line 12, "an" should read -- a --;
Line 16, "by" should be deleted;
Line 29, "non-uniformity" should read -- variation --;
Line 39, "can be thereof" should be deleted;
Line 42, "non-uniformity" should read -- variation --; and
Line 55, "ROM" should be deleted.

UNITED STATES PATENT AND TRADEMARK OFFICE
CERTIFICATE OF CORRECTION

PATENT NO. : 6,179,402 B1
DATED : January 30, 2001
INVENTOR(S) : Akio Suzuki et al.

It is certified that error appears in the above-identified patent and that said Letters Patent is hereby corrected as shown below:

Column 5,
Line 21, "element" should read -- elements --;
Line 22, "non-uniformity" should read -- variation --;
Line 55, "process)" should read -- process) ; --;
Line 56, "nozzle" should read -- nozzles --;
Line 59, "nozzle" should read -- nozzles --; and
Line 60, "the" should read -- each --.

Column 6,
Line 55, "after" should read -- after it is --.

Column 7,
Line 5, "the" (second occurrence) should be deleted.

Signed and Sealed this

Fifth Day of February, 2002

Attest:

Attesting Officer

JAMES E. ROGAN
*Director of the United States Patent and Trademark Office*